Sept. 2, 1958 R. MAROGG 2,849,932
METHOD AND APPARATUS FOR MAKING FILTER RODS
Filed Jan. 31, 1955 5 Sheets-Sheet 1

INVENTOR.
RICHARD MAROGG
BY
ATTORNEY

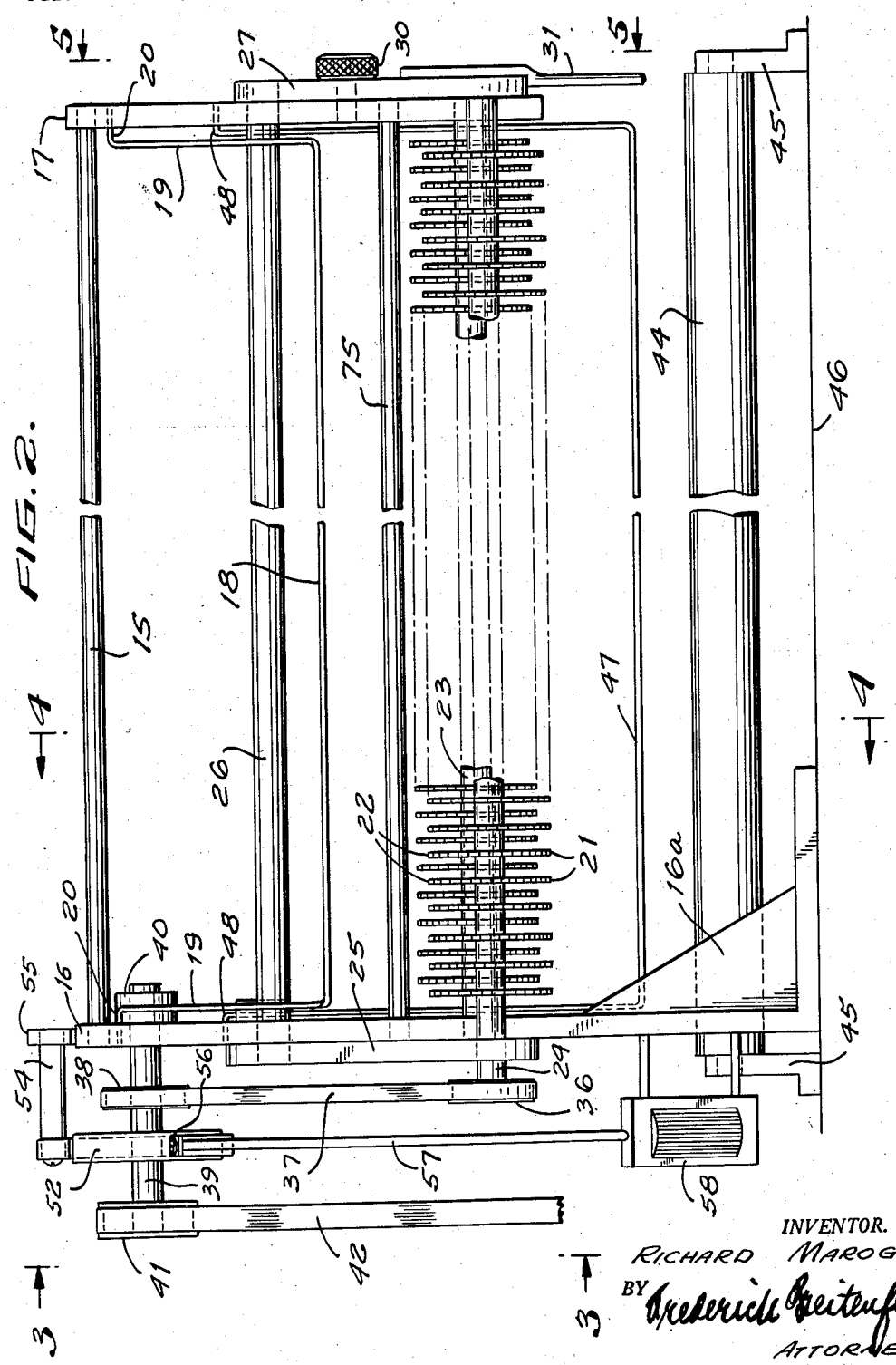

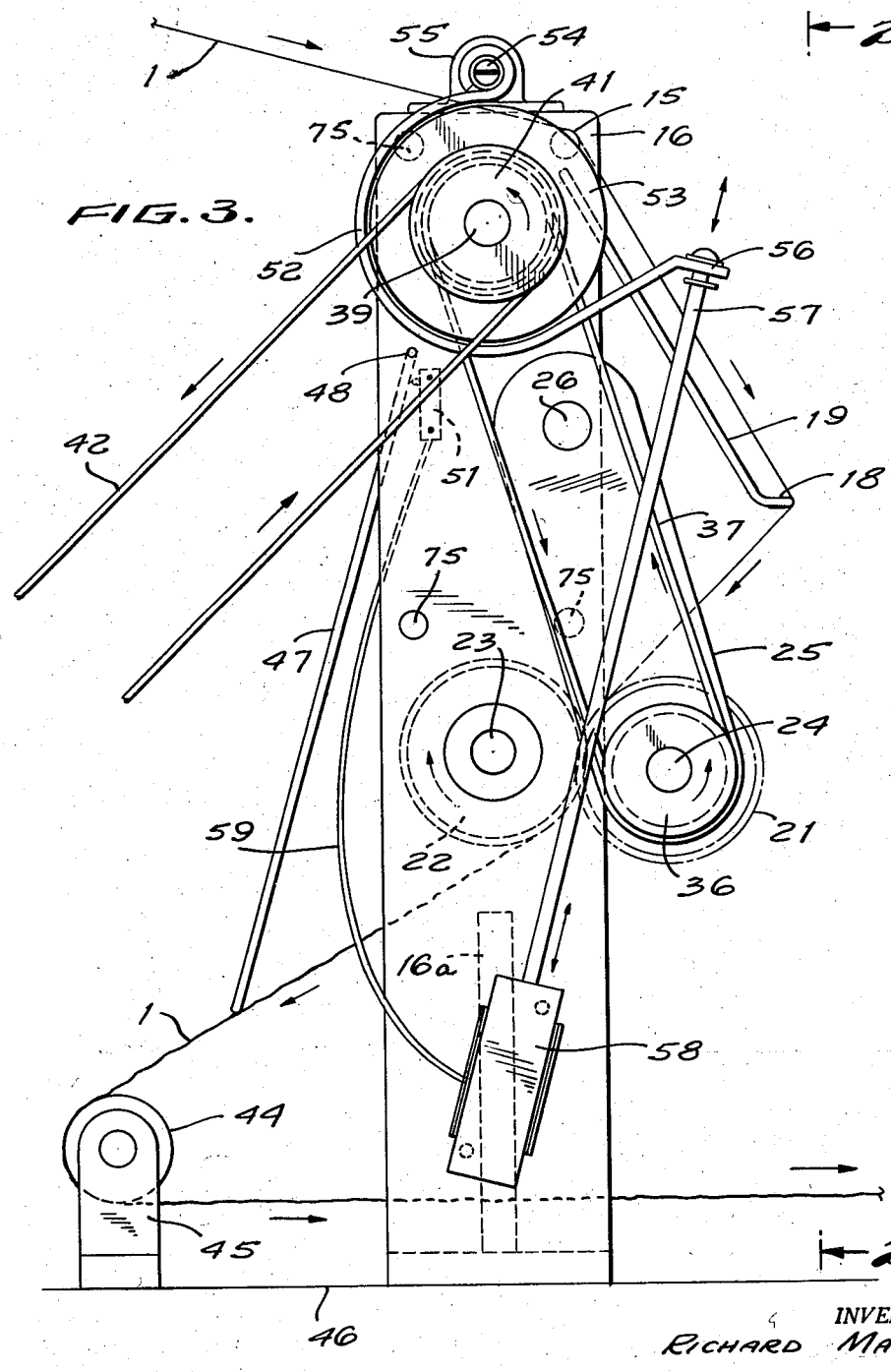

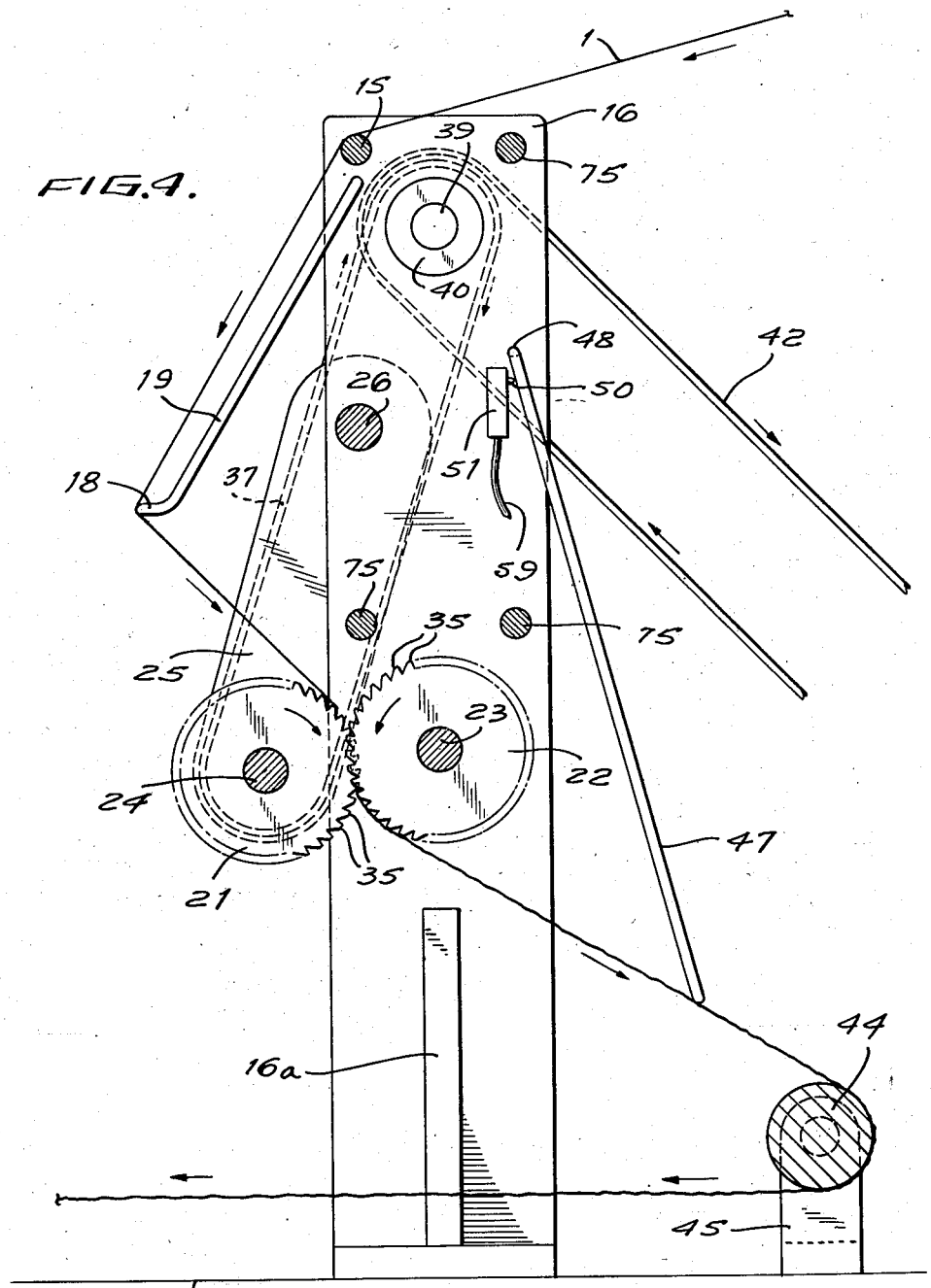

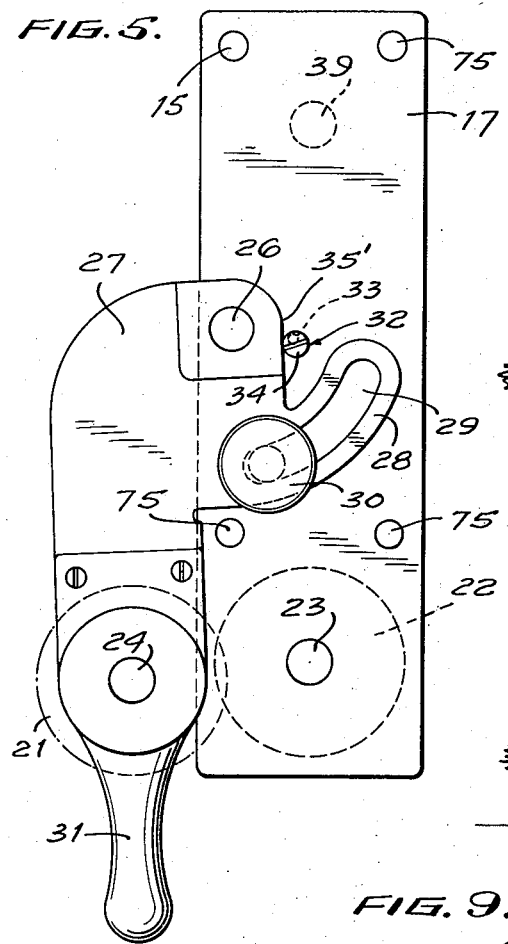
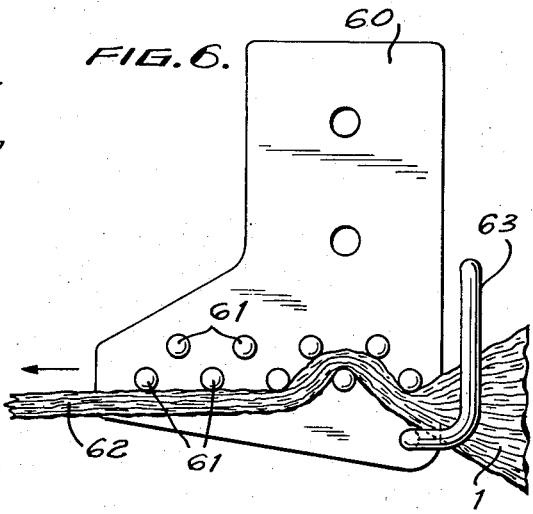
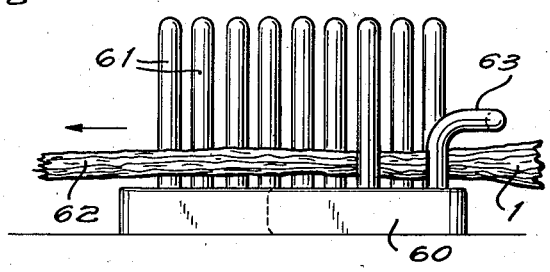
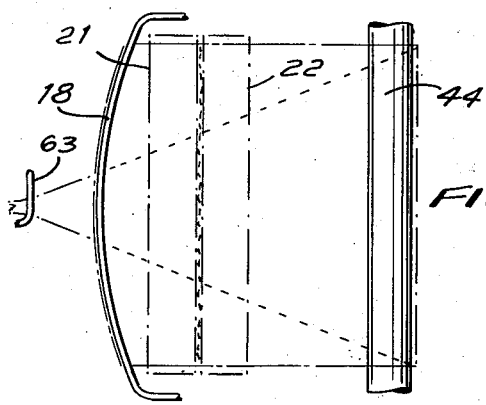
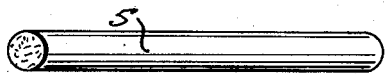
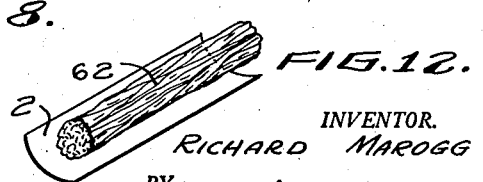

United States Patent Office 2,849,932
Patented Sept. 2, 1958

2,849,932

METHOD AND APPARATUS FOR MAKING FILTER RODS

Richard Marogg, Hastings on Hudson, N. Y., assignor to Peter J. Schweitzer, Inc., New York, N. Y., a corporation of New York Application January 31, 1955, Serial No. 484,991

18 Claims. (Cl. 93—1)

This invention relates to the manufacture of filters of the type especially adapted for use in so-called "filter-tip" cigarettes, and has particular reference to an improved method and apparatus for making a "filter rod" consisting of a compacted rod-like mass of fibrous filtering material enclosed within a wrapper strip.

It is a general object of the invention to provide a means for producing continuous filter rod lengths of more uniform character.

Since the optimum sought in a filter of this kind is a maximum smoke filtering effect with a minimum of interference with smooth "drawing" qualities, it is another object of the invention to achieve the greater uniformity of filter rod without impairment of either the filtering effect or the "draft." In fact, the improved procedure and apparatus lend themselves to adjustment and control whereby any desired degree of "draft," or of filtering effect, may be accurately achieved.

The invention relates specifically to the known type of procedure in which a web of fibrous material such as paper or its equivalent is drawn from a continuous supply, converged or gathered to form a relatively compact rod-like strand or bundle, and then enclosed within a wrapper strip. The resultant continuous filter rod is customarily cut into selected lengths, and individual short lengths are ultimately incorporated with the cigarettes by the cigarette manufacturer, or used in similar fashion in cigarette holders or the like.

A special feature of the improved procedure resides in the release and exposure of additional fibres in the original fibrous web, prior to its formation into the rod-like condition. Another feature lies in subjecting the compacted rod, after its formation but prior to its enclosure within the wrapper, to a carefully controlled tensioning that stretches the rod to a desirable accurately regulated extent. By stretching it slightly beyond its elastic limit, an advantage is achieved in that the fibrous masses of the severed sections will not recede from the ends of the sections after they have been cut.

It is an object of the invention to provide an apparatus by means of which these procedures may be effectively carried out automatically, continuously, and in a thoroughly practical and economical commercial fashion. More particularly, the invention provides an efficient means for lacerating or mutilating a continuous web of fibrous material as it is drawn from a supply, the tearing effect being substantially uniformly distributed across the area of the web to release and expose fibres; a means for carefully regulating the degree of laceration so that in no case is the continuity of the web impaired; a means for maintaining the web at a substantially uniform degree of tautness; and a means for stretching the compacted rod-like bundle by a selected amount.

With these and other objects to be hereinafter set forth in view, I have devised the arrangement of parts to be described and more particularly pointed out in the claims appended hereto.

In the accompanying drawings, wherein an illustrative embodiment of the invention is disclosed, Fig. 1 is a diagrammatic view of an apparatus made according to the invention;

Fig. 2 is an elevational view of the apparatus, looking in the direction of the arrows 2—2 in Figs. 1 and 3;

Fig. 3 is a side elevational view of the apparatus looking from the left of Fig. 2;

Fig. 4 is a sectional view taken on the line 4—4 of Fig. 2, looking in the direction of the arrows;

Fig. 5 is a side elevation of a part of the structure, looking in the direction of the arrows 5—5 in Fig. 2;

Fig. 6 is a top plan view of the tension control;

Fig. 7 is a front elevational view of the tension control;

Fig. 8 is a detail view to show the course of the web over the arched spreader to the converging and compacting means;

Fig. 9 is a perspective view of the continuous filter rod before being cut into sections;

Fig. 10 shows one of the cut-off sections;

Fig. 11 shows a filter plug as cut from the section shown in Fig. 10, and in readiness for insertion in a cigarette, and Fig. 12 shows the filter opened to disclose the filtering material in its compacted form.

Figure 1:
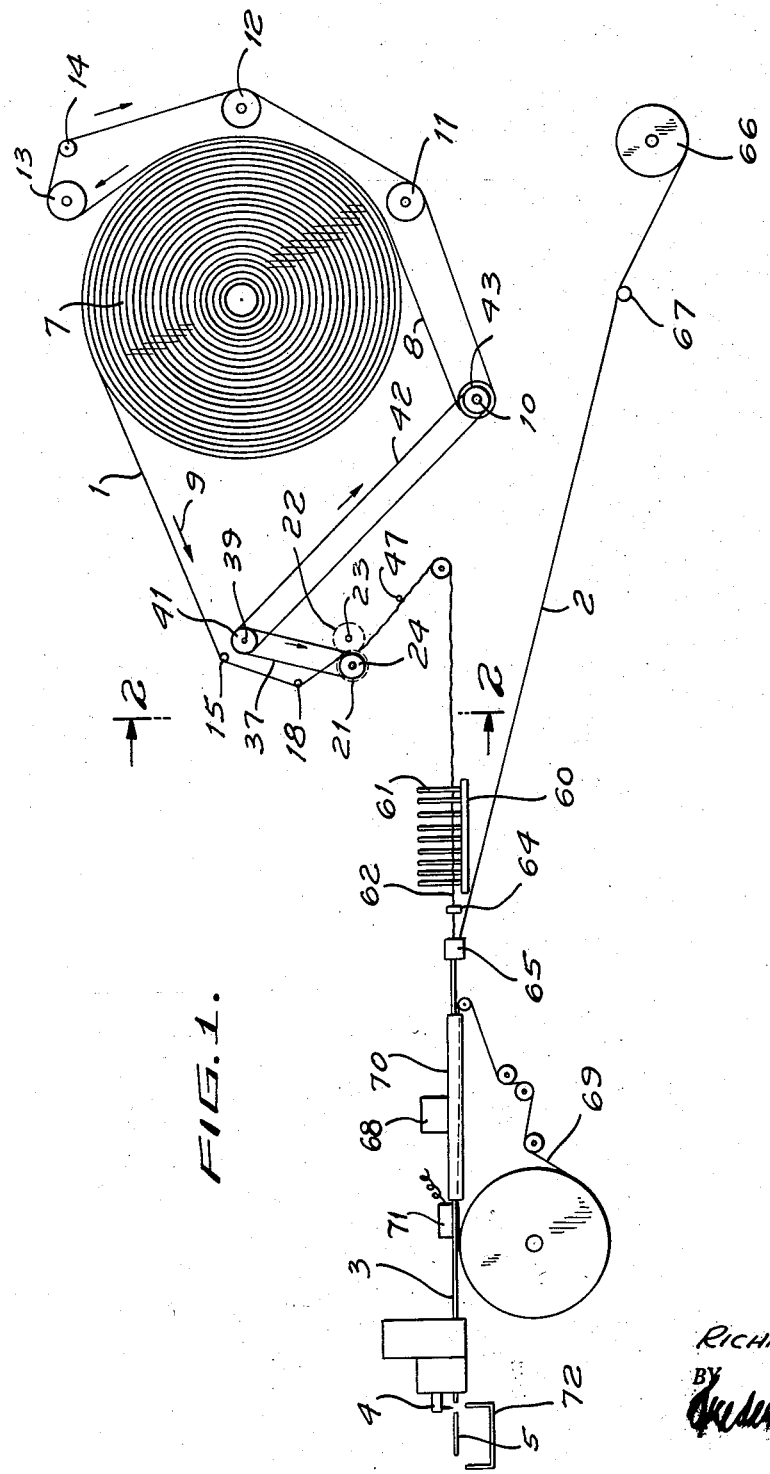

The filtering material referred to herein is preferably, but not necessarily, composed of relatively thin cellulosic tissue, or of some other paper of similar characteristics, namely, of fibrous nature having good filtering characteristics. It is easily tearable or destructible in a manner to spread or separate its fibers, and of a softness to enable it to be compressed or compacted into rod-like formation without destruction of its porosity. While the terms "web" and "paper" are both used herein, the intent is in each case to refer to any fibrous material in sheet form having the tearability, porosity, and other characteristics alluded to.

In the making of the filter the paper is preferably drawn from a roll, and the web passes between mutilating or lacerating fiber-separation disks to be thereafter gathered and compacted into rod-like formation, tensioned, and then enclosed in a tubular wrapper and cut off into sections of predetermined length. As will be seen in Fig. 9, the filter material shown at 1, is enclosed in a tubular wrapper which may be of paper, and the wrapped filter bundle emerges from the forming means as a continuous rod 3. This rod is cut off into the desired lengths 5, by the knife or other cutting instrumentality 4 shown in Fig. 1. Subsequently, the filter rod shown at 5 is cut into relatively shorter lengths, as shown at 5a in Fig. 11, for incorporation into cigarettes in the known manner.

By reference to Fig. 1, it will be seen that the filter paper 1 is supplied in a roll 7 from which it is fed in the form of a web, by means of a belt 8 which frictionally contacts with the surface of the roll 7 and feeds the paper therefrom in the direction of the arrow 9. The belt 8 is a continuous one, is driven from the motor-driven main shaft 10, and extends around the rollers indicated respectively at 11, 12, 13 and 14. This driving arrangement and the mounting of the rollers and belt is such that the belt 8 is maintained in constant contact with the periphery of the roll 7 regardless of the changing diameter of the rolls as the web of paper is fed from it.

The apparatus includes an upright 16 (Fig. 2) having its lower end supported by a bracket 16a mounted on the base or table 46. Supported by a plurality of rods 15 and 75 extending from the upright 16 is a plate 17.

As the web of paper 1 leaves the roll 7 it passes over the rod 15 extending between the upright 16 and the plate 17. After passing over the rod 15, the web extends downwardly and over an outwardly-bowed or arched web-distension guide or spreader 18 (Fig. 8). The guide 18 tends to spread the paper web and acts to prevent the formation of longitudinal wrinkles or folds in the paper as the web proceeds to the mutilating disks to be presently described.

The spreader or web-support 18 is in the form of a bowed rod having upwardly-extending side arms 19 formed with laterally-bent ends 20 pivotally mounted in the uprights 16 and 17 (Fig. 2). After passing over the spreader 18, the web travels between a plurality of paper-mutilating disks 21 and 22. The disks shown at 22 are secured upon an idler shaft 23, while the disks shown at 21 are secured on a driven shaft 24. Shaft 24 is rotatably supported at one end by the hanger 25, pivotally suspended on the pivot rod 26 that extends between the upright 16 and plate 17. The opposite end of the shaft 24 is rotatably supported in a pivoted bracket 27, shown in detail in Fig. 5. The pivot for the bracket 27 consists of the rod 26, and the bracket 27 includes a curved segment 28 formed with an arcuate slot 29 through which a set-screw 30 projects and threadably extends into the plate 17. The lower end of the bracket 27 is provided with a handle 31 by means of which the bracket 27 and the shaft 24 and the disks 21 may be moved away from the disks 22 to thereby facilitate the threading of the paper web 1 between the two sets of disks 21 and 22. This movement of the shaft 24 can take place only while the set screw 30 is loosened.

A precise adjustment of the two sets of disks 21 and 22 toward or away from each other is attained by an adjusting device indicated generally at 32 in Fig. 5. This device consists of a screw, eccentrically threaded at 33 into plate 17, and having the edge of its slotted head 34 operative against the shoulder 35' on the bracket 27. By rotation of the head 34 of the screw 32, it will be apparent that the position of the bracket 27, and hence of the shaft 24 supported thereby, can be accurately regulated. Thus the spacing between the two sets of mutilating disks can be controlled. When the desired spacing between the disks 21 and 22 is attained, the set screw 30 can be tightened and the spacing between the disks thus maintained indefinitely.

As will be seen in Fig. 2, the disks 21 and 22 are spaced apart on their respective shafts and the disks on one shaft are arranged so that they fit between those on the other shaft. As just explained, the extent of overlap of the disks on the two shafts is determined by the adjustment 32 and this adjustment can be used to secure the required laceration or mutilation of the paper in the web 1 as it passes between the two sets of disks 21 and 22. It will be noted that the edges of the disks are toothed or serrated, as shown at 35, and the inclination of these teeth, as well as their size and arrangement, is dependent upon the mutilating effect sought. In the form shown, the teeth 35 incline in a direction opposite to the direction of rotation of the disks on which the teeth are formed, so that no really vigorous tearing or slitting action is applied to the paper web. The result sought is primarily a light haphazard mutilation or laceration of the paper to displace and thereby disarrange the fibers thereof so that greater binding together of the paper fibers takes place when the web is compacted into the rod-like formation.

The lacerations produced by the teeth 35 are substantially uniformly spaced across the area of the web. The tearing effect results from the fact that the web is under a slight tension as it is drawn through the mutilation area, and the piercing action of the teeth severs and releases fibers that move apart. The continuity of the web is not affected, although the degree of tension in it is lessened to the extent that the severed or disarranged fibers have separated.

The shaft 24 on which the disks 21 are mounted carries at one end a pulley 36 about which a belt 37 extends. The belt travels over a pulley 38 secured on a short shaft 39, rotatively supported in the bearing 40 mounted in upright 16. Shaft 39 also carries a pulley 41 over which the belt 42 passes. This belt extends around a pulley 43 (Fig. 1) secured on the main drive shaft 10.

After the web 1 passes between the mutilating disks 21 and 22 it is moved downwardly and angularly around the idler roller 44 rotatably supported in the brackets 45 secured on the base or table 46. Operative between the idler 44 and the mutilating disks is a feed control which consists of a substantially U-shaped rod or feeler 47 having its upper ends pivotally mounted at 48 in the upright 16 and plate 17. The lower end of the rod or feeler 47 is maintained by gravity in contact with that part of the web that is located between the mutilating disks and the idler roller 44. When the paper is relatively without material slack between the disks and idler, the angle of inclination of the feeler 47 is such that its upper end is maintained in a position, relative to the operating member 50 of a micro-switch 51 mounted on the upright 16, that the switch is in its open or inoperative position. When the web 1 sags between the mutilating disks and idler roller 44, the feeler 47 swings inwardly, or toward the operating member 50 of the switch 51, to close the switch and cause a brake to become operative to slow up the rate of feed of the web until the excess slack in the web is taken up.

The brake referred to consists of a brake band 52 (Fig. 2) extended around a drum 53 secured on the shaft 39. One end of the brake band 52 is anchored to the pin 54 projecting from a bracket 55 mounted on the top of the upright 16. At its opposite end, the brake band is attached at 56 to the upper end of a rod 57 extending from and constituting an extension of the core of a solenoid 58. The rod 57 is normally in its lowered position to maintain the brake 52 released. Wiring 59 connects the micro-switch 51 to the solenoid 58 and to a source of electric current (not shown). The arrangement is such that as long as the paper web, in the area between the mutilating disks 21 and 22 and the idler roller 44, is maintained without material slack, the feeler 47 permits the micro-switch 51 to remain open and thus the solenoid will not be energized. As soon as slack occurs in the web in the area just mentioned, the feeler 47 swings against the operating member 50 of the switch, closes the switch 51 and causes energization of the solenoid 58, and the solenoid thrusts the rod 57 upwardly and causes it to apply the brake 52 against the drum 53. This results in a reduction in the speed of rotation of the shafts 39 and 24 and a resultant slow-down of feed of the web 1 until the slack therein is taken up. When the excess slack is eliminated, the switch 51 opens, the brake 52 is released, and the normal speed of feed of the web 1 is resumed.

After the web passes around the idle roller 44, it proceeds toward the left (as viewed in Figs. 1 and 4) to suitable tensioning means shown in detail in Figs. 6 and 7. This tensioning means includes a base plate 60 suitably mounted on the base 46 of the apparatus. Rising from the top of the plate 60 is a plurality of upright pins 61 arranged in two rows, with the pins in one row staggered in relation to those in the other row, so that when the rod-like compacted strand 62 of the fibrous paper 1 is deviously inserted between the pins 61 in the two rows, the pins will resist longitudinal movement of the paper and will thus tension the strand accordingly. The extent of stretch can be regulated by the manner in which the strand is undulated between various pins. At the entrance end of the tensioning device is provided a guide rod under which the converging web extends and which co-operates with the pins in gathering the web and holding it against rising movement.

The stretching effect of the tensioning means results from the fact that the continuous rod of filtering material is pulled toward the left (as viewed in Fig. 1) by the driving belt 69, and the engagement of the compacted bundle by the pins 61 resists this advancement. This resistance can be regulated by passing the bundle around more or fewer pins 61, and it is preferred that the tension be raised and maintained at an amount that stretches the filter rod slightly beyond its elastic limit. The degree of stretch also affects the amount of filtering material in each unit volume of the end product, as a result of which the "draft" qualities can be rather accurately controlled.

After passing from between the tensioning pins 61, the strand 62 proceeds through a guide member 64 (Fig. 1), then through a second guide member 65 where it meets the wrapper strip 2. The wrapper 2 is drawn from a roll 66 and proceeds over a suitable guide rod 67 to the guide member 65 through which it passes in company with the strand 62 and is folded into the form of a tube about the rod 62. From this point on, the apparatus assumes the aspect of a conventional cigarette-making machine, and includes the gluing means 68 which applies glue to one of the edges of the wrapper 2. The drive belt 69 carries the wrapper, and the compacted content within it, through a tubular former 70, and the filter rod emerging therefrom is that as shown at 3 in Fig. 9. A heater shown at 71 serves to dry the glue which unites the overlapped edges of the wrapper, and the knife or cutter 4, operating at properly timed intervals, cuts the sections 5 from the filter rod, the severed sections falling into the suitably-positioned collection hopper 72.

From the foregoing, the operation of the apparatus will be readily understood. The fibrous filter paper is fed from the roll 7 by the feed belt 8, and the web moves over the rod 15, over the bowed guide bar 18, and thence between the mutilating disks 21 and 22. As it passes between these disks it is lacerated in a manner to disarrange and displace its fibers, affording greater compactness and uniformity, and enhanced absorbent properties, when the web is formed into the strand 62. After receiving the desired mutilation by the disks 21 and 22, the web moves downwardly and around the idler roller 44, and the functioning of the brake 52 in the manner previously described prevents the possibility of any unduly slack portion of the web wrapping itself in undesirable manner around the rotated mutilating disks 21. After leaving the idler roller 44, the web converges under the guide element 63, and in the gathered strand-like form 62 it is extended undulatingly between as many of the pins 61 as may be required to apply the desired tension. The now-compacted strand 62 then proceeds to merge with the wrapper 2 and to become enclosed thereby, being ultimately cut off into the separate lengths 5.

As hereinbefore stated, a feature of importance in connection with the tensioning of the strand 62 resides in the fact that the strand can be enveloped by its wrapper 2 while the filter material is stressed beyond the limit of its elasticity. Hence when the filter rod is cut into the required lengths, both in producing the section 5 as well as when cutting that section into shorter pieces shown in Fig. 11, there is no tendency of the filter paper to retreat into the enclosing wrapper in a manner to possibly cause the ends of the wrapper to protrude beyond the ends of the filter paper. As a result, when the filter rod is severed into either long or short sections, the ends of the filter material in such sections will always be flush with the ends of the enclosing wrapper. Moreover, the tension control is usable to vary the amount of filter paper in the filters to thereby meet various filtering requirements.

The filters produced by the described process and structure are unusually uniform, with equal distribution of the filter paper throughout their lengths; the formation of continuous linear folds producing undesired direct or straightline passages through the filter is greatly reduced if not completely eliminated; and the filtering action is desirably effective while not retarding the draft through the cigarette of which the filter forms a part.

While only a single embodiment of the invention has been illustrated and described, it is obvious that the invention is not to be restricted thereto, but is broad enough to cover all structures coming within the scope of the annexed claims.

Having thus described my invention what I claim as new and desire to secure by Letters Patent is:

1. In an apparatus of the character described, means for feeding a fibrous web, a pair of sets of web-mutilating disks between which the web is moved and which lacerate the web and tend to separate the fibers thereof without destroying the transverse continuity of the web, the disks in one of the sets entering between the disks in the second set, tensioning means to which the web is subjected after leaving the mutilating disks to thereby stress the paper beyond the limit of its elasticity, means for compacting the web, means for delivering a wrapper together with the compacted web to forming mechanism which applies the wrapper around the compacted web to form a filter rod, and means for severing the rod into sections of predetermined length.

2. In an apparatus of the character described, means for feeding a fibrous web, means for mutilating the web to thereby disarrange the fibers thereof, means for converging and compacting the web into a rod-like formation, means for maintaining the rod under selected tension to stress it beyond the limit of its elasticity, means for applying wrapper material around the stressed rod while the latter is tensioned, to thereby form a wrapped filter rod, and means for severing said rod into sections of predetermined length.

3. In an apparatus of the character described, means for feeding a fibrous web, and web-mutilating disks between which the web is fed and which disarrange the fibers of the web, one set of said disks being mounted on a driven shaft, said disks being spaced apart relative to one another, a second set of disks being mounted on an idler shaft, the disks in the second set entering between those in the first set, the peripheral edges of the disks in both sets being serrated.

4. In an apparatus as provided for in claim 3, wherein the driven shaft is adjustable toward the idler shaft, the serrations on the edges of the disks in each set being in the form of inclined teeth, the inclination being in a direction opposite to the direction of rotation of the disk on which the teeth are formed.

5. In an apparatus of the character described, means for supporting a roll of fibrous paper, means frictionally operative against the periphery of the roll for feeding a web of paper from the roll, a rotatable shaft carrying a plurality of toothed, web-mutilating disks, an idler shaft carrying a plurality of similar disks, the disks on one of the shafts entering between the disks on the other shaft, the web being fed between the disks on both shafts, means for preventing the development of slack beyond a predetermined extent in the web after the web has passed between the mutilating disks, means for causing convergence and compacting of the web after it leaves the disks, means for thereafter stretching the compacted web to a predetermined degree, means for applying a wrapper around the stretched compacted web, and means for cutting the wrapped paper mass into sections of predetermined length.

6. In an apparatus of the character described, means for feeding a web of paper, mutilating disks between which the web is fed and which mutilate the web and tend to displace the fibers thereof without destroying the transverse continuity of the web, means for converging and compacting the web into a rod-like formation, tensioning means through which the rod is passed to stress the rod beyond the limits of the elasticity of its material, wrapper-feeding means, forming means through which the wrapper in company with the compacted and stressed rod of paper is fed, to thereby apply the wrapper around the rod, and severing means by which the wrapped rod is cut into sections of predetermined length.

7. In an apparatus of the character described, means for feeding a web of paper, mutilating means operative upon the web to displace and disarrange the fibers of the paper, means by which the web is converged into rod-like formation and enclosed in a tubular wrapper, and means between the mutilating means and the wrapper-enclosing means for tensioning the paper to an extent beyond the limits of its elasticity.

8. In an apparatus of the character described in claim 7, wherein the tensioning means consists of a plurality of spaced pins between which the paper is moved in an undulating manner.

9. In an apparatus of the character described, means for feeding a web of paper, a plurality of toothed lacerating disks between which the web is fed to thereby lacerate the web and displace the fibers thereof, and spreading means interposed between the feeding means and disks to spread the web as it is fed to the disks, said spreading means consisting of a bowed member over which the web is moved.

10. In an apparatus of the character described, means for supporting a roll of paper, feed means operative against the periphery of the roll for feeding a web of paper from the roll, a plurality of toothed disks between which the web is fed, said disks being operative to mutilate the paper web and tend to separate the fibers thereof without destroying the transverse continuity of the web, a guide roller over which the web passes after it leaves the mutilating disks, means interposed between the mutilating disks and the guide roller for controlling the rate of feed of the web, means for converging and compacting the web into rod-like formation after it leaves the guide roller, tension means through which the rod-like strand passes and which stretch the rod, forming means into which the rod-like strand passes in company with a wrapper, wrapping means for applying said wrapper about the compacted strand, and means for cutting the resultant wrapped filter rod into sections.

11. In an apparatus of the character described in claim 10, wherein the toothed mutilating disks are arranged in two sets, one of said sets being carried on a driven shaft and the other set mounted on an idler shaft, the disks in one set extending between the disks in the other set, means for adjusting the driven shaft to and from the idler shaft, and the tension means consisting of a plurality of spaced pins between which the rod-like strand of filter paper is undulatingly passed.

12. In the process of making a filter rod in which a web of fibrous material is drawn longitudinally from a continuous supply roll and gathered to form an advancing rod-like bundle, and in which the bundle is thereupon enclosed within a continuously advancing wrapper, the procedure which consists in stretching the rod-like bundle slightly beyond its elastic limit prior to its enclosure.

13. In the process of making a filter rod in which a web of fibrous material is drawn longitudinally from a continuous supply roll and gathered to form an advancing rod-like bundle, and in which the bundle is thereupon enclosed within a continuously advancing wrapper, the procedure which consists in mutilating the web after its withdrawal from the supply roll and prior to the formation of the rod-like bundle, to release and displace fibers thereof, and then stretching the bundle to a selected accurately controlled extent prior to its enclosure within said wrapper.

14. In an apparatus of the character described, means for feeding a fibrous web, a pair of sets of web-mutilating disks between which the web is moved and which lacerate the web and tend to separate the fibers thereof without destroying the transverse continuity of the web, the disks in one of the sets entering between the disks in the second set, means for compacting the mutilated web, means for applying a wrapper around the compacted web to form a filter rod, tensioning means independent of the web-feeding means and interposed between the web-feeding means and the wrapper applying means for stretching the compacted web as it approaches the wrapper applying means, and means for severing the filter rod into predetermined lengths.

15. In an apparatus of the character described, means for feeding a fibrous web, web-mutilating apparatus through which the web is moved and which lacerates the web to release fibers thereof without destroying the transverse continuity of the web, means for compacting the mutilated web, means for applying a wrapper around the compacted web to form a filter rod, tensioning means independent of the web-feeding means and interposed between the web-feeding means and the wrapper applying means for stretching the compacted web as it approaches the wrapper applying means, and means for severing the filter rod into predetermined lengths.

16. In an apparatus of the character described, web-feeding means, web-compacting means, wrapper-feeding means, means for applying the wrapper around the compacted web to form a filter rod, and tensioning means independent of the web-feeding means and operative to move the compacted web through a devious path, said tensioning means being interposed between the web-feeding means and the wrapper-applying means for regulatably stretching the compacted web as it is fed to the wrapper-applying means.

17. In the manufacture of a filter rod from a web of fibrous material, the procedure which consists in longitudinally advancing the web, lacerating the web during its advancement to form haphazard mutilation and fiber displacement without destroying the transverse continuity of the web, and converging the lacerated web to form a rod-like bundle.

18. In the manufacture of a filter rod from a web of fibrous material, the procedure which consists in longitudinally advancing the web, lacerating the web during its advancement to form haphazard mutilation and fiber displacement without destroying the transverse continuity of the web, and converging the lacerated web to form a rod-like bundle, and enclosing the bundle in a tubular wrapper.

References Cited in the file of this patent

UNITED STATES PATENTS

| | | |
|---|---|---|
| 661,295 | Rigamonti et al. | Nov. 6, 1900 |
| 1,638,560 | Beveridge | Aug. 9, 1927 |
| 1,871,151 | Brown | Aug. 9, 1932 |
| 1,964,874 | Fankboner | July 3, 1934 |
| 2,039,298 | Davidson | May 5, 1936 |
| 2,045,539 | Eitzen | June 23, 1936 |
| 2,164,702 | Davidson | July 4, 1939 |
| 2,195,201 | Carlson | Mar. 26, 1940 |
| 2,699,098 | Lyons | Jan. 11, 1955 |

Notice of Adverse Decision in Interference

In Interference No. 89,920 involving Patent No. 2,849,932, R. Marogg, METHOD AND APPARATUS FOR MAKING FILTER RODS, final judgment adverse to the patentee was rendered Jan. 21, 1965, as to claims 7 and 15.

[*Official Gazette June 22, 1965.*]